May 19, 1970  M. BAERMANN  3,513,395
ELECTRIC METER WITH COIL PIVOTED ON REMOTE AXIS
Filed April 19, 1966  3 Sheets-Sheet 1
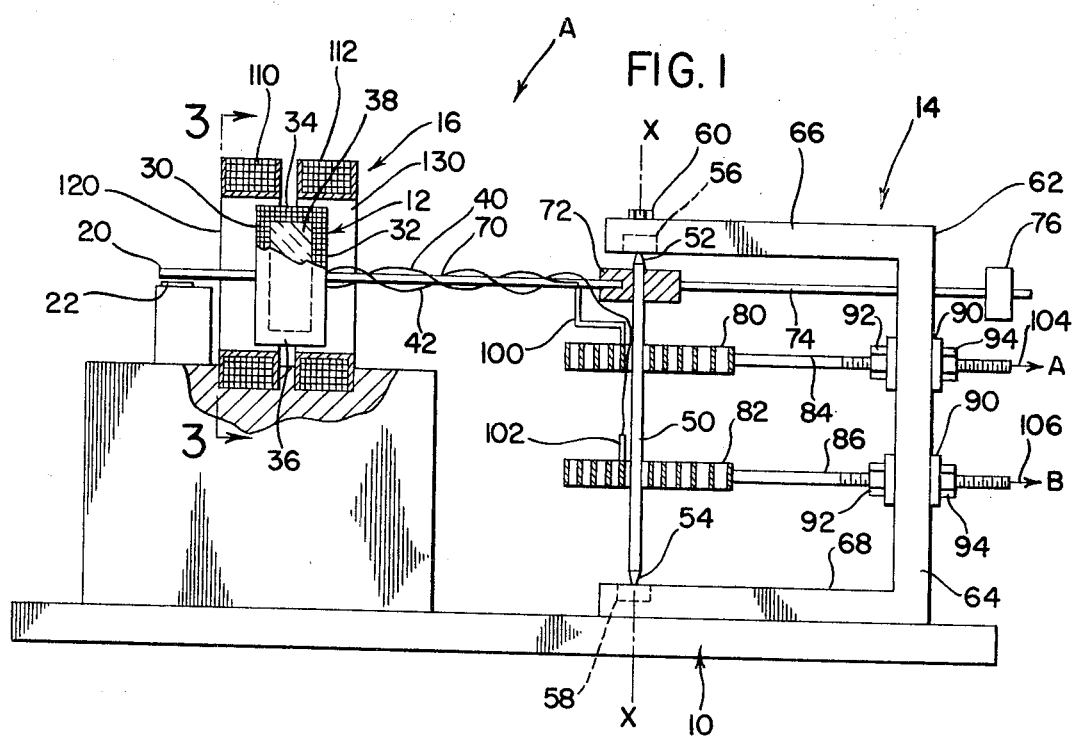
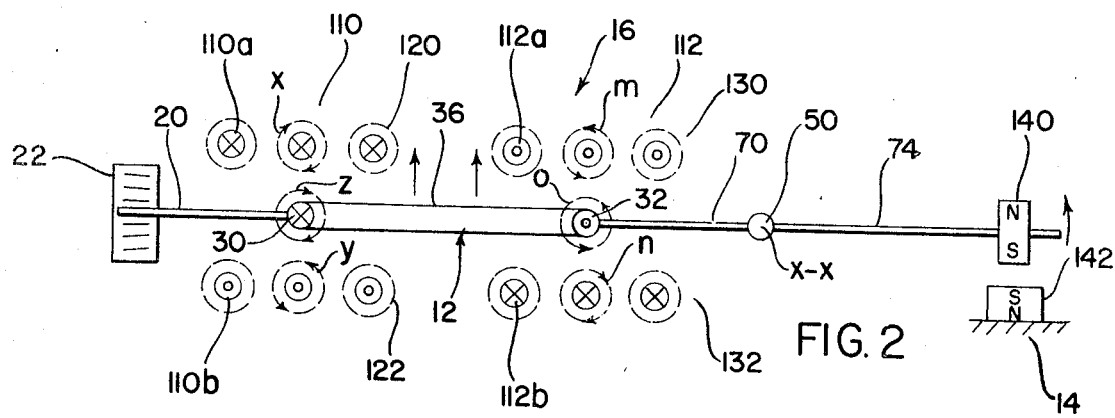
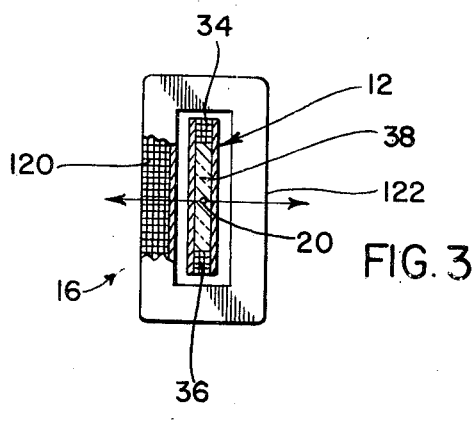
INVENTOR.
MAX BAERMANN
BY
Meyer, Tilberry & Body
ATTORNEYS

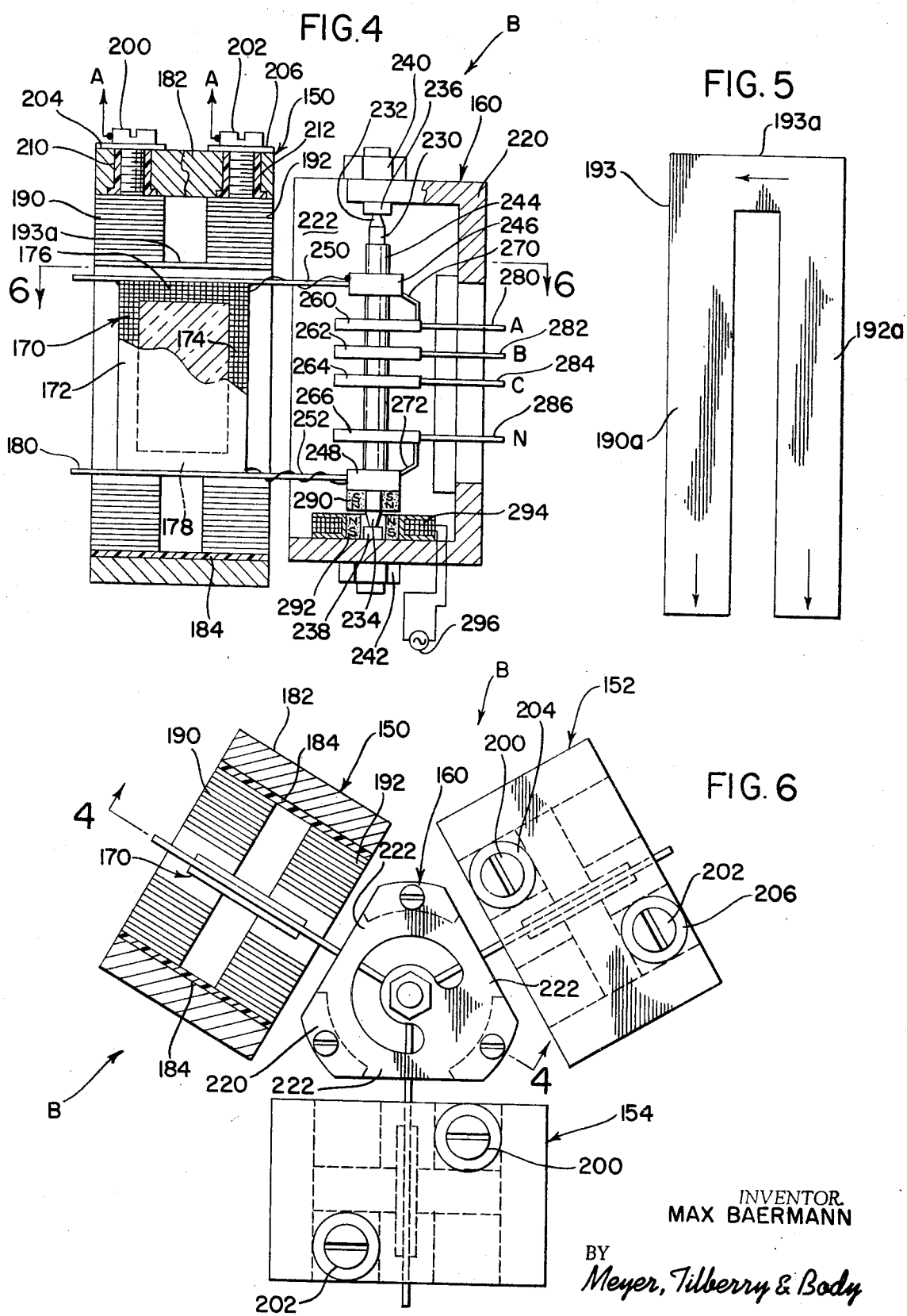

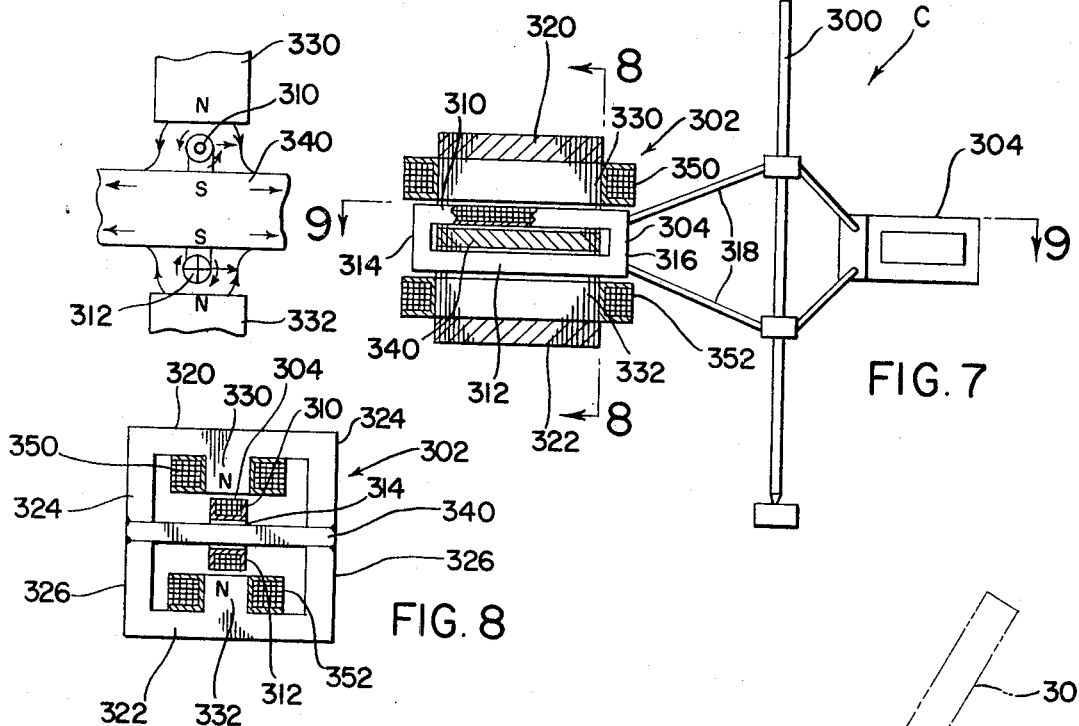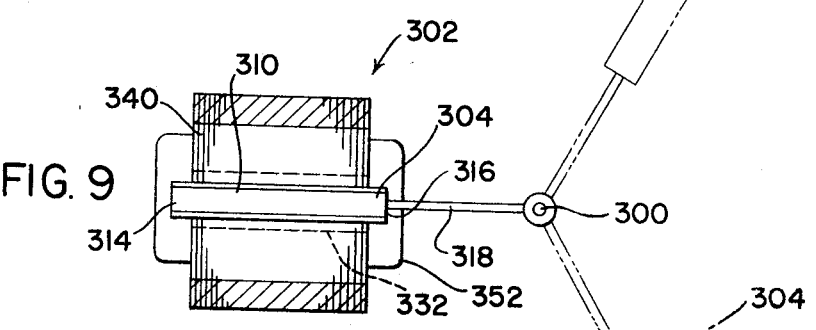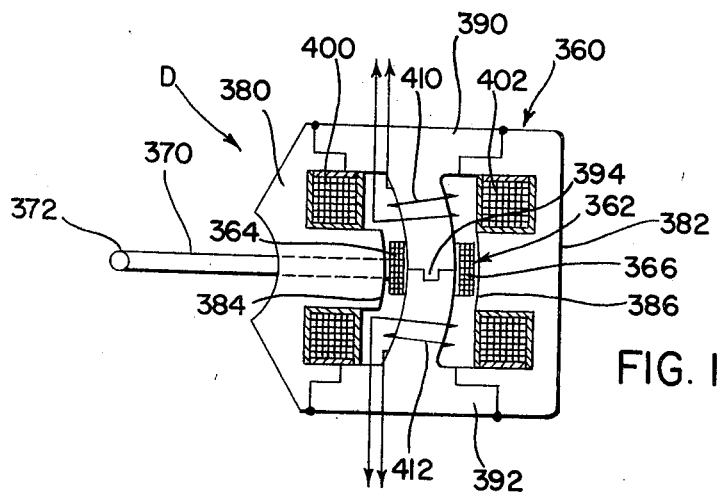

United States Patent Office 3,513,395
Patented May 19, 1970

3,513,395
ELECTRIC METER WITH COIL PIVOTED ON REMOTE AXIS
Max Baermann, 506 Bensberg Wulfshof, Bezirk, Cologne, Rhine, Germany
Filed Apr. 19, 1966, Ser. No. 543,748
Claims priority, application Germany, Apr. 25, 1965, B 81,608; June 1, 1965, B 82,196
Int. Cl. G01r *11/32*
U.S. Cl. 324—144                     5 Claims

ABSTRACT OF THE DISCLOSURE

An electric meter comprising a movable coil having first and second generally parallel legs and pivoted about a remote axis and separate flux creating means adjacent each leg to create the motor movement of the meter wherein the flux creating means either surrounds the coil or the legs are movable in generally flat planes to reduce the size of the meter and increase its sensitivity.

---

The present invention pertains to the art of electric meters and more particularly to a movable coil electric meter.

The invention is particularly adapted for measuring the power consumed in a single phase, or a three phase, alternating current electrical system, and it will be described with particular refeernce thereto; however, it will be appreciated that the invention has much broader applications and may be used for measuring various other parameters which can be represented by current flow.

Electric meters heretofore used for measuring power in an electrical system have generally included a stationary coil having relatively few turns of a large conductor. Inside the stationary coil there was provided a rotatable or movable coil formed from a fine conductor and having a relatively large number of turns. Current of the system being measured was passed through the stationary coil, and a current representative of the voltage in the system being measured was passed through the rotatable coil. In this way, the displacement of the rotatable or movable coil was somewhat proportional to the power being consumed by the electrical system. In these prior electric power meters, or wattmeters, the axis of rotation of the movable coil was located within the stationary coil. The current was supplied to the movable or voltage coil by torsion springs or similar elements which were secured to a rotatable frame which carried the movable coil. These torsion springs or elements biased or forced the movable coil into a preselected position. In other words, these torsion springs serve the dual function of introducing current to the movable coil and of biasing the coil into a selected position. Current flow through both the movable and stationary coils caused the movable coil to rotate within the stationary coil in a manner which would indicate the consumed power of the electrical system being monitored.

In order to provide a more accurate reading, the angle through which the movable coil rotated was made relatively small. In this manner, the prior meters were rendered somewhat more linear in operation. A rotatable knob was often connected to the rotatable or movable coil by the spiral torsion springs so that the rotatable coil could be adjusted to the zero position by turning the knob. When the coil was adjusted to the zero position by the knob through the torsion spring, an indicator registered the amount of knob movement which indicated the power being consumed by the monitored system.

The prior meter, as described above, was used for both alternating current and direct current electrical systems; however, it requires a relatively large volume. This disadvantage becomes especially troublesome when the system being monitored was a polyphase electrical system. In such a situation, each phase required a separate meter movement. Placing a plurality of the prior meters into a single module was not too practical because of the difficulty resulting from combining the dual pointer arrangement used to measure the consumed power of each meter movement. In addition, combination of the prior meters for three phase use required stacking the meters. Thus, the meters occupied a rather alreg space.

These and other disadvantages of prior meters for measuring the power of an electrical system have been overcome by the present invention which relates to a meter which occupies a minimum space, even through a multiphase electrical system is being monitored.

In accordance with the present invention, there is provided an electrical meter comprising a coil having first and second generally parallel legs, means for passing a current representative of a first parameter through the coil with the current flow in the legs being in opposite directions, means for pivotally mounting the coil to oscillate about an axis remotely spaced from the coil, the first and second legs of the coil oscillating in separate first and second spaces, first coil means for creating a first flux pattern in the first space, second coil means for creating a second flux pattern in the second space, and means for passing the same current representative of a second parameter through the coil means. The first and second coil means are then polarized to cause the flux patterns in both spaces to force both of the coil legs in the same direction with respect to the axis by separate and distinct magnetomotive forces on each coil leg.

By constructing a meter in accordance with the invention as defined above, a three phase meter may be provided by mounting three separate meters around a common rotatable axis remotely located with respect to all meters. A common indicator may be provided at the common rotatable axis without requiring complicated adjusting and calculating mechanisms. In addition, it is not necessary to stack a plurality of separate and independent meters, one on top of the other, to provide a multiphase power meter. For this reason, the vertical height and the overall space of a meter constructed in accordance with the present invention, when used for a multiphase system, are relatively small.

All of these advantages are accomplished by providing the rotatable axis for the movable voltage coil outside of the actual coil driving unit. Prior meters have been constructed with the movable coil having a rotatable axis within the drive unit itself. In addition, by using two separate legs of the movable coil for driving this coil with respect to a remotely located pivotal axis, the sensitivity of the meter is increased over the sensitivity of the meter having only one leg of the movable coil being operated upon by a magnetomotive force. The sensitivity may also be adjusted by simply increasing the spacing between the pivotal axis of the coil and the coil.

In accordance with a more specific aspect of the present invention, each of the legs of the movable coil is generally parallel to the remotely spaced rotatable axis for the coil and a separate current coil is placed around each of the two spaced legs. The direction of current flow in each current coil is in an opposite direction. By this arrangement, the distance between the spaced current coils can be relatively small and the lengths of the upper and lower non-active branches of the movable coil can also be relatively short. Consequently, the weight of the voltage coil is reduced although the overall torque being transmitted to the voltage coil by the vertical coil legs is not diminished. In other words, the parallel vertically disposed legs of the voltage coil determines the amount of torque being transmitted to the pivotal axis, and this torque may be maintained large when compared with the length of the upper and lower branches or legs of the movable voltage coil. In accordance with the present invention, the upper and lower, or more broadly the inactive, legs of the movable coil do not perform a primary torque creating function. By constructing a voltage coil having two relatively long legs and two relatively short legs, the moment of inertia of the coil and its supporting structure is kept somewhat small. Consequently, a meter constructed in accordance with the present invention is well adapted for adjustment by changing the length of a support arm between the coil and its pivotal axis. More torque is transmitted to the remotely located pivotal axis by increasing the length of the support arm. This feature of the present invention is completely different from providing a movable coil having a pivotal axis located within the fixed coil of the meter. In such a case, a change in the output torque of the meter can be accomplished only by increasing the size of the movable coil or by changing other components of the meter.

To incorporate the present invention in a balanced meter, two separate drive units, as explained above, can be located on diametrically opposite sides of the central rotary axis with the movable coils in each drive unit being connected onto the same rotatable element. By passing currents in different directions through the two spaced movable coils, a balancing effect is created at the center of the rotatable element.

The primary object of the present invention is the provision of an electric meter of the movable coil type, which meter has relatively small external dimensions when compared with prior similar meters, is accurate and sensitive in operation, and is easily adapted for multiphase use.

Another object of the present invention is the provision of an electric meter of the movable coil type, which meter includes a movable coil, with two spaced legs and a remotely located pivotal axis, and a stationary flux creating device for influencing each leg of the coil separately.

Still another object of the present invention is the provision of an electric meter of the movable coil type, which meter may be read directly by an external indicator.

Another object of the present invention is the provision of an electric meter of the movable coil type, which meter may be used to measure power in a multiphase system by simply combining individual meters in a common horizontal plane.

Yet another object of the present invention is the provision of an electric meter of the movable coil type, which meter may be used to measure power in a multiphase system without requiring a substantial increase in the vertical height of the meter.

These and other objects and advantages will become apparent from the following description used to illustrate the preferred embodiments of the invention as read in connection with the accompanying drawings in which:

FIG. 1 is a partially cross-sectioned, side elevational view illustrating, somewhat schematically, the preferred embodiment of the present invention;

FIG. 2 is a schematic view illustrating the operating characteristics of the invention shown in FIG. 1, with a slight modification;

FIG. 3 is a partially cross-sectioned view taken generally along line 3—3 of FIG. 1;

FIG. 4 is a cross-sectional view illustrating a modification of the present invention taken generally along line 4—4 of FIG. 6;

FIG. 5 is a top plan view of a blank for the dual current coil used in FIGS. 4 and 6;

FIG. 6 is a partially cross-sectioned, top plan view illustrating the embodiment of the invention shown in FIG. 4 when used in a three phase system;

FIG. 7 is a schematic side elevational view illustrating, in cross-section, a further modification of the present invention;

FIG. 8 is a cross-sectional view taken generally along line 8—8 of FIG. 7;

FIG. 8A is a schematic view showing the operating characteristics of the invention illustrated in FIGS. 7, 8, 9 and 10;

FIG. 9 is a cross-sectional view taken generally along line 9—9 of FIG. 7; and,

FIG. 10 is an enlarged schematic view illustrating a further modification of the present invention.

Referring now to the drawings wherein the showings are for the purpose of illustrating preferred embodiments of the invention only and not or the purpose of limiting same, FIGS. 1–3 show a meter A used for measuring the power in a single phase electrical system, not shown. As basic elements, meter A includes a lower support base 10, an oscillating movable coil 12, a coil support unit 14, a drive unit 16, a pointer 20, a scale 22.

Referring now more particularly to the movable coil 12, this coil includes vertically extending, relatively long parallel legs 30, 32 and horizontally extending relatively short parallel legs 34, 36. These various legs are formed by winding relatively fine wire many times around an insulated spool 38. In accordance with the preferred embodiment of the invention, the lengths of legs 34, 36 are not substantially more than one-half of the lengths of legs 30, 32. In other words, the vertical legs 30, 32 are relatively long when compared to the horizontal legs. Coil 12 includes outwardly extending power leads 40, 42 for receiving a current representative of the voltage within the electrical system being monitored.

Coil support 14 includes a vertical stand 50 rotatably mounted about a generally vertical axis x—x by pointed ends 52, 54 extending into jeweled bearings 56, 58. Vertical pressure on the stand 50 is adjusted by an appropriate means, such as an upper screw 60. The vertical stand 50 is supported within a frame 62 having an upright leg 64 and generally parallel, spaced horizontal legs 66, 68. Of course, the frame 62 is only schematically represented in the drawings, and various arrangements could be used to mount the rotatable vertical stand 50. A support arm 70 secured onto spool 38 connects the movable coil 12 with the vertical stand 50 through an insulating collar 72. Extending in an opposite direction from the insulating collar is a counterbalance arm 74 having a slidable weight 76. In practice, two counterbalance arms 74 are used with one being spaced behind upright legs 64, as shown, and the other being spaced in front of this leg. This latter counterbalance arm is not shown. It is appreciated that the arm 74 must be freely oscillated about axis x—x without interference from the upright leg 64. For this reason, the use of two angulaly disposed arms accomplishes this function.

The support 14 also includes vertically spaced torsion springs 80, 82 having a movable end connected onto stand 50 and a relatively fixed end connected onto adjusting screws 84, 86, respectively. The adjusting screws extend through insulating grommets 90, as illustrated. Nuts 92, 94 on opposite sides of the grommets are used to pretension the tension springs 80, 82. Leads 100, 102 are provided on the torsion springs to form an electrical connection with coil leads 40, 42, respectively. Leads 100, 102 are, in turn, connected through both the torsion springs and the adjusting screws 84, 86 onto the input leads 104, 106 so that a current flows through the movable coil 12 in accordance with the voltage within the system being monitored. Stand 50 is formed from an insulating material, or it has an appropriate outer insulation. This prevents establishment of an electrical path through the stand and between the two torsion springs 80, 82.

Referring now to the drive unit 16, this unit includes two closely spaced stationary coils 110, 112 which form spaces or cavities to receive the opposite legs 30, 32, respectively, of coil 12. Consequently, each long, vertically extending leg of the coil 12 is under the influence of a different stationary coil. The coil 110 includes a relatively few turns of a heavy conductor. The coil thus includes vertical conductor portions 110a, 110b on opposite sides of leg 30, as best shown in FIG. 2. In a like manner, stationary coil 112 includes vertical conductor portions 112a, 112b, positioned on opposite sides of leg 32. The various conductor portions 110a, 110b, 112a, and 112b, combine to form transversely spaced coil branches 120, 122, 130, and 132, respectively.

Referring now in more detail to FIG. 2, the operation of meter A is schematically illustrated. Current flow through movable coil 12 creates current flow in opposite directions within legs 30, 32. Coils 110, 112 also have currents flowing therethrough. These currents are representative of the current flow within the system being monitored. In accordance with the invention, the current flow through the spaced coils 110, 112 is in opposite directions. This causes current flow through the various conductor portions as depicted in FIG. 2. The cross at the end of a conductor indicates that current is flowing, at one instance, into the plane of the drawing. In a like manner, a small circle indicates that current is flowing out from the plane of the drawing. This directional current flow through the various conductors creates flux fields $x, y, z, m, n,$ and $o$ which coact to force coil 12 toward the coil branches 120, 130. When all currents simultaneously reverse directions, the coil 12 is still forced toward coil portions 120, 130. The relative values of the current flow through the stationary and movable coils determines the amount by which coil 12 is displaced. This amount of movement is proportional to the magnitude of the currents flowing in the various coils, and it is read directly on scale 22.

In a manner previously explained, the torsion springs 80, 82 bias the movable coil 12 in a direction toward branches 122, 132 of coils 110, 112. FIG. 2 illustrates a modification for biasing the coil 12 in the direction opposite to which it is moved by current flow through the various coils. This modification includes a first permanent magnet 140 carried by counterbalance arm 74 and a second permanent magnet 142 fixed onto the support 14. The polarities of these magnets is such that a controlled repulsive force is exerted on arm 74. Other similar permanent magnet arrangements could be provided for accomplishing this biasing function.

Referring now to FIGS. 4 and 6, a further modification of the present invention is illustrated wherein meter B is used to measure the power in a three phase electrical system. Although this embodiment of the invention uses a modified drive unit and a modified support unit, it is appreciated that the drive unit and support unit of FIG. 1 can be used to measure power of a three phase electrical system with slight modifications, as taught by the disclosure of FIGS. 4 and 6. Meter B includes three separate drive units 150, 152, 154 arranged in a generally symmetric manner around a common support 160. In other words, the individual drive units are spaced from each other by an angle of approximately 120°. If more or less phases were to be measured, the angle between the units could be determined by dividing 360° by the number of phases being metered; i.e. $360°/n$.

The drive units 150, 152, 154 are substantially identical; therefore, only drive unit 150 will be described in detail, and this description will apply equally to the other drive units. Mounted within the drive unit 150 is a movable voltage coil 170 having vertically extending legs 172, 174 and horizontally extending legs 176, 178. A pointer 180 extends from the drive unit for registering the displacement of the coil 170. A high permeability casing 182 is positioned around the drive unit and is separated from the interior thereof by an insulation layer 184 which isolates the casing from the internal stationary coils 190, 192. These coils are formed from a copper blank 193, shown in FIG. 5. This blank includes elongated legs 190a, 192a. By winding these two legs in opposite directions around a rectangular form having a shape generally corresponding with the desired space in which coil 170 is to oscillate, a realatively inexpensive dual current coil can be produced. The intermediate portion 193a of blank 193 forms the inner connecting link between the two coils. Being more specific, leg 190a is rolled to form coil 190, and leg 192a is rolled in the opposite direction, to form coil 192. This dual coil is then placed within the casing 182 so that the ends of legs 190a, 192a are contacted by inwardly extending bolts 200, 202. These bolts are electrically isolated by insulating washers 204, 206 and insulating bushings 210, 212. Of course, there is an appropriate insulation to separate the two spaced coils 190, 192 adjacent the bolts 200, 202. This insulation is not illustrated.

Referring now to the common support 160, this support includes a casing 220 with windows 222 facing toward the respectives drive units 150, 152, and 154. Within the casing there is provided a common vertical stand 230 having opposite pointed ends 232, 234. These ends are received within jeweled bearings 236, 238. Adjustment of the vertical height and the compression forces on the stand 230 is made by rotation of spaced nuts 240, 242. These nuts are operably connected onto the jeweled bearings, or their support housings. An insulating sleeve 244 surrounds the stand 230 and supports axially spaced conductive collars 246, 248. These collars carry support arms 250, 252 for connecting the movable coils 170 onto the common stand 230 whereby the coils move in unison.

Torsion springs 260, 262, 264, and 266 are provided for biasing the coils into their proper positions. This function has been previously described. Torsion springs 260, 262, and 264 are used to direct a current, representative of a voltage in a given phase, to the respective spaced coils 170. As shown in FIG. 4, spring 260 for phase A is connected by lead 270 with the coil 170. A lower lead 272 connects a common torsion spring 266 onto conductive collar 248. This completes an electrical circuit through coil 170. The other phases of the meter B are wired in a similar manner. To accomplish this, there are provided input leads 280, 282, 284, and 286, as shown in FIG. 4. The operation of the individual drive units 150, 152, 154 are similar to the drive unit 16, shown in FIG. 1. For this reason, no further discussion is required. Any pointer 180 can be used for the output reading, since they all move in unison.

Referring to the lower jeweled bearing 238, the sleeve 244 of stand 230 is provided with an axially magnetized annular permanent magnet 290. In a like manner, there is provided another annular permanent magnet around the jeweled bearing. By providing like poles of the magnets 290, 292 facing each other, the magnets provide a repulsive force which relieves the vertical force on the lower bearing 238. In accordance with another aspect of the invention, a coil 294 surrounds the magnet 292 and is connected to an alternating current generator 296. In this manner, current flow through the coil 294 vibrates the bearing surfaces at the lower portion of support 230. This somewhat reduces the total friction encountered by the stand 230. It is appreciated that other permanent magnet bearings could be provided with the surrounding vibrating coil for reducing the friction thereof.

Referring now to FIGS. 7-9, a further modification of the present invention is illustrated. In accordance with this modification, a three phase meter C includes a common rotatable stand 300, three separate drive units 302, and three movable coils 304. Referring now to the movable coils, they include relatively long, parallel longitudinal legs 310, 312 and relatively short, parallel vertical legs 314, 316. Support arms 318 connect each of the movable coils with the common stand 300.

Referring now to the drive unit 302, each unit includes two spaced E-shaped cores 320, 322 formed from laminations of a high permeability material, such as soft iron. Core 320 includes spaced legs 324, and core 322 includes spaced legs 326. In addition, the respective cores 320, 322 are provided with inwardly facing pole pieces 330, 332. These pole pieces combine with a common laminated plate 340 to define spaced air gaps in which legs 310, 312 may shift in a direction transverse to the pole pieces. Coils 350, 352 formed from a few turns of heavy electrical conductors are provided on the spaced cores 320, 322, respectively. Preferably coils 350, 352 are provided on the pole pieces of these cores.

Referring now to FIG. 8A, the operation of the invention illustrated in FIGS. 7–9 is schematically represented. The current flowing through coils 350, 352 is selected so that each pole piece has the same polarity, i.e. north or south. Consequently, flux lines between the pole pieces and the common plate 340 extend in opposite directions when compared with the legs 310, 312. Since current is flowing through legs 310, 312 in opposite directions, the movable coil 304 is moved or oscillated about its pivotal axis by separate and independent magnetomotive forces acting upon the spaced legs; however, both forces tend to move in the same direction. This direction is to the right in FIG. 8A. When the polarity of the currents flowing through coils 304, 350, and 352 are reversed, the movable coil 304 still moves in the same direction. The amount of coil movement or deflection is the result of the relative current flows through the various coils.

Referring now to FIG. 10, a direct current wattmeter D incorporating the present invention is illustrated. This meter includes a drive unit 360, a movable coil 362 having relatively long legs 364, 366, and a support arm 370. The arm 370 allows the coil 362 to pivot around point 372 which is on an axis substantially perpendicular to the axis of meter B illustrated in FIGS. 7–9.

Referring now to the drive unit 360, this unit includes two E-shaped cores 380, 382 having curved pole pieces 384, 386, respectively. The air gaps in which the movable coil oscillates are defined by two separate plate sections 390, 392 which have curved outer surfaces generally matching the curved surfaces of the spaced pole pieces. These sections are joined at appropriate interlocking joint 394 generally in the midplane of the drive unit. Current coils 400, 402 are provided around the pole pieces. When a direct current is passed through the coils 400, 402 in opposite directions and through the coil 362, the coil is moved transversely with respect to the pole pieces 384, 386. Since the coil 362 reciprocates around an axis generally parallel with the legs 364, 366 the coil moved in an arcuate path having a center of curvature generally the same as the center of curvature of the air gaps formed within the drive unit. The operation of this embodiment of the invention is well adapted for a direct current wattmeter.

A pair of coils 410, 412 are provided on the plate sections 390, 392. In accordance with this aspect of the invention, an alternating current is applied to these coils in-between operations of the direct current wattmeter. In this manner, any residual magnetism remaining in the core of the drive unit can be eliminated by repeated reverse magnetization of the core. Consequently, when the meter D is again used, the residual magnetism of the pole pieces does not introduce slight errors in the measured quantity.

The present invention has been described in connection with certain structural embodiments; however, it should be appreciated that various changes may be made in these embodiments without departing from the intended spirit and scope of the present invention as defined in the appended claims.

Having thus defined my invention, I claim:

1. An electric meter comprising a coil having first and second generally parallel legs; means for passing a current representative of a first parameter through said coil with current flow in said legs being in opposite directions; means for pivotally mounting said coil to oscillate about an axis remotely spaced from said coil; said first and second legs oscillating in separate first and second spaces, respectively; first coil means for creating a first flux pattern in said first space; second coil means for creating a second flux pattern in said second space; and means for passing the same current representative of a second parameter through both of said coil means; said first and second coil means being polarized to cause said flux patterns to force both of said legs in the same direction with respect to said axis by separate magnetomotive forces on each of said legs, said first and second spaces being defined by pairs of spaced pole pieces extending along said legs, and said first and second coil means including coils for magnetizing said pole pieces, and said patterns being flux fields extending across said pole pieces, and a demagnetizing coil surrounding one of said pole pieces in each of said pairs of pole pieces and means for passing an alternating current through said demagnetizing coil between actuations of said meter.

2. An electric meter comprising a coil having first and second generally parallel legs; means for passing a current representative of a first parameter through said coil with current flow in said legs being in opposite directions; means for pivotally mounting said coil to oscillate about an axis remotely spaced from said coil; a drive unit associated with said coil; said drive unit comprising: a high permeability core having a common bar and two pole pieces extending from opposite directions toward said bar, said bar and pole pieces defining spaced air gaps with one of said legs movable in each air gap in a direction transverse of said pole pieces; an energizing coil associated with each of said pole pieces to cause flux lines to extend through said air gaps; and means for passing a current through said energizing coils to magnetize said pole pieces simultaneously with the same polarity, said current in said energizing coils being representative of a second parameter, and a demagnetizing coil associated with said common bar and means for passing an alternating current through said demagnetizing coil between actuations of said meter.

3. An electric meter comprising: a movable coil assembly including a support structure, a deflection indicator and a multi-turn coil secured to said support structure and having first and second generally parallel legs; means for pivotally mounting said assembly about an axis remote from said coil, said coil assembly including a support arm extending between said axis and said support structure; a first fixed coil means having a first central opening, said first leg being in said first opening and surrounded by said first fixed coil means; a second fixed coil means having a second central opening, said second leg being in said second opening and surrounded by said second fixed coil means; said central openings being dimensioned to allow said coil to oscillate about said axis on said arm; said arm extending through one of said central openings; means for passing a current representative of a first parameter through said coil with current flow in said legs being in opposite directions; means for passing the same current representative of a second parameter through both of said coil means; said first and second coil means being polarized to cause said flux patterns to force both of said legs in the same direction with respect to said axis by separate magnetomotive forces on each of said legs.

4. An electric meter for measuring the power of an electrical system having $n$ phases, said meter having a stand pivotally mounted about a vertical axis; a support arm for each of said phases extending radially from said stand with said arms moving said stand; and a drive unit for each of said phases; each drive unit comprising: a movable coil mounted onto one of said arms and having first and second generally parallel legs; means for passing a first current representative of the voltage in one of said phases through said coil with current in said legs being in opposite directions; flux creating means associated with each of said legs for forcing said legs by magnetomotive force in the same direction with respect to said axis, said flux creating means responsive to a second current representative of current in said one phase, said flux creating means including two fixed coils, each having a central opening, one of said fixed coils surrounding said first leg and the other of said fixed coils surrounding said second leg; and, said support arm passing through one of said central openings.

5. An electric meter for measuring the power of an electrical system having $n$ phases, said meter having a stand pivotally mounted about a vertical axis; a support arm for each of said phases extending radially from said stand with said arms moving said stand; and a drive unit for each of said phases; each drive unit comprising: a movable coil mounted onto one of said arms and having first and second generally parallel legs; means for passing a first current representative of the voltage in one of said phases through said coil with current in said legs being in opposite directions; flux creating means associated with each of said legs for forcing said legs by magnetomotive force in the same direction with respect to said axis, said flux creating means responsive to a second current representative of current in said one phase, said axis being generally perpendicular to said parallel legs whereby said legs oscillate in generally flat planes.

References Cited

UNITED STATES PATENTS

| | | | |
|---|---|---|---|
| 1,163,070 | 12/1915 | Day. | |
| 1,647,332 | 11/1927 | Angus | 324—141 X |
| 2,593,973 | 4/1952 | Briggs | 324—155 X |
| 2,817,816 | 12/1957 | Medlar | 324—146 X |
| 2,929,994 | 3/1960 | Nycz et al. | 324—150 X |
| 2,953,747 | 9/1960 | Gilbert | 324—144 X |
| 2,980,857 | 4/1961 | Langford | 324—150 |
| 3,143,704 | 8/1964 | Wright | 324—155 |

FOREIGN PATENTS 917,136  8/1954  Germany.

ALFRED E. SMITH, Primary Examiner

U.S. Cl. X.R.

324—107; 335—223